United States Patent [19]

Ball

[11] Patent Number: 5,121,844
[45] Date of Patent: Jun. 16, 1992

[54] GARMENT TRANSFER RACK

[75] Inventor: Gary J. Ball, Candler, N.C.

[73] Assignee: Ball's Machine & Manufacturing Co., Inc., Candler, N.C.

[21] Appl. No.: 821,758

[22] Filed: Jan. 14, 1992

[51] Int. Cl.$^5$ ................................................ A47F 5/00
[52] U.S. Cl. .................................. 211/124; 211/105.3; 224/313
[58] Field of Search .................. 211/124, 123, 105.3, 211/7; 224/313, 320, 42.46 R, 42.46 A

[56] References Cited

U.S. PATENT DOCUMENTS

| | | | |
|---|---|---|---|
| 2,805,780 | 9/1957 | Brennan | 211/123 |
| 2,846,079 | 8/1958 | Leeper | 211/123 |
| 3,021,958 | 2/1962 | Winkler | 211/124 |
| 3,298,503 | 1/1967 | Field | 211/124 X |
| 3,355,031 | 11/1967 | Kleehammer | 211/123 |
| 3,424,314 | 1/1969 | Cornelsen | 211/105.3 |
| 3,481,483 | 12/1969 | Harvey et al. | 211/123 X |
| 4,037,726 | 7/1977 | Schweers | 224/313 X |
| 4,340,145 | 7/1982 | Cameron | 211/124 |
| 4,494,896 | 1/1985 | DiFranco | 211/123 X |
| 4,887,727 | 12/1989 | Simmerman et al. | 211/124 |

*Primary Examiner*—Robert W. Gibson, Jr.
*Attorney, Agent, or Firm*—Carter & Schnedler

[57] ABSTRACT

A transfer rack for transportation of garments on hangers in a truck, such as a typical rental truck, having opposite-side tie-down attachments on interior walls thereof. An adjustable-length rod includes a tubular outer element and a solid inner element telescopingly received in the outer element so as to provide a six-inch range of adjustment. A hanger-securing bar is movably mounted along an upper surface of the adjustable-length rod, with one end of the hanger-securing bar attached to the tubular outer element and the other end of the hanger-securing bar attached to the inner element. To accommodate relative movement as the outer and inner elements are telescoping adjusted, the hanger-securing bar includes an elongate slot having a length corresponding to the six-inch range of adjustment. A pair of adaptable hooks are provided at respective ends of the adjustable-length rod and are configured so as to engage tie-down attachments either in the form of tie-down rings or in the form of horizontal slats on opposite sides of the truck inner walls.

9 Claims, 2 Drawing Sheets

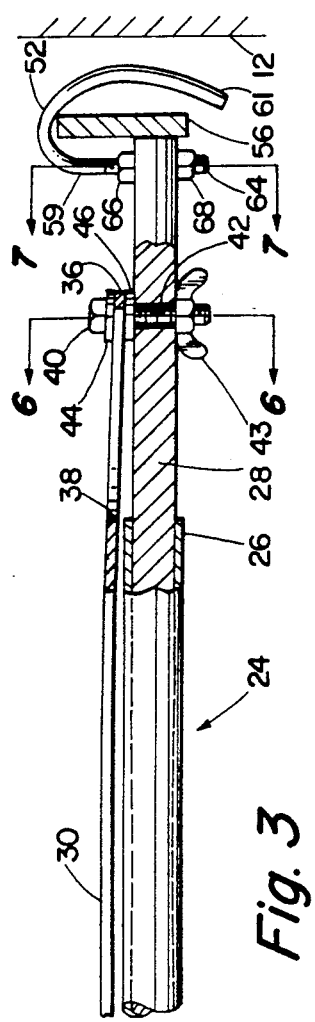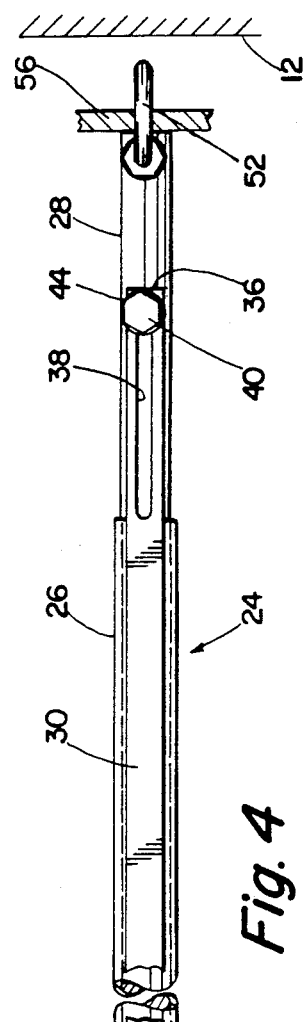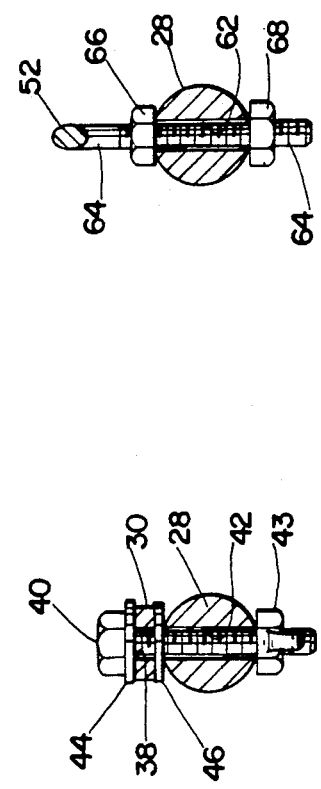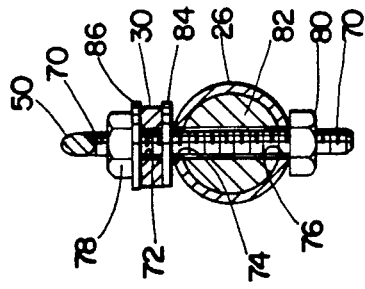

5,121,844

GARMENT TRANSFER RACK

BACKGROUND OF THE INVENTION

The present invention relates generally to transfer racks or hanger bars for transporting garments in vehicles and, more particularly, to such transfer racks for use in common configurations of rental trucks having opposite-side tie-down attachments on interior walls thereof.

When moving from one residence to another, it is common for persons to rent a truck of appropriate size from a truck rental company. Many household items can either be boxed or placed directly into such a truck.

Clothing, however, presents particular problems, where it is desired to prevent clothing from coming unduly wrinkled during the moving process. There are two usual alternatives.

One alternative is to purchase a quantity of specialized containers, conventionally known as wardrobe boxes, made of heavy corrugated cardboard and including a stamped metal hanger bar extending across the top of the box. While wardrobe boxes serve well their intended purpose, they are relatively expensive and, in a typical move, many are required.

The other usual alternative is to transport clothing across the back seat of an automobile, employing a telescoping bar sold for that purpose and configured at its ends to engage hooks commonly provided in automobiles for clothes hangers. This approach has its drawbacks as well. For example, due to logistical concerns, an automobile or sufficient space in an automobile may not be available. Also, clothes hung in this fashion are typically suspended only a few feet above the back seat, and all but the shortest garments tend to become wrinkled in any event.

SUMMARY OF THE INVENTION

Accordingly, it is an object of the invention to provide an alternative means for transporting garments.

It is a related object of the invention to provide a transfer rack suitable for transportation of garments on hangers in a truck, such as a typical rental truck.

It is another object of the invention to provide such a transfer rack which is relatively lightweight for ease of handling, and yet which is sufficiently robust to withstand repeated use and potential abuse as a rental item.

It is another object of the invention to provide such a transfer rack which fits a variety of trucks of different sizes from different companies.

It is yet another object of the invention to provide such a transfer rack which reliably transports garments in the sense that the transfer rack is itself securely retained in the truck, and garments on hangers are securely retained on the transfer rack, notwithstanding ordinary bumps and movement attendant to travel over roadways.

Another object of the invention is to give rental truck companies and moving companies another means of helping people move and another source of revenue for the company.

In accordance with the invention, there is provided a transfer rack for transportation of garments on hangers in a truck having opposite-side tie-down attachments on interior walls thereof. Such tie-down attachments are typically either tie-down rings such as eye bolts, or horizontal slats mounted on spacers distributed periodically along the length of each slat.

The transfer rack includes an adjustable length rod for supporting garment hangers having hooks. The adjustable length rod has a tubular outer element and an inner element telescopingly received in the outer element so as to provide a range of adjustment. The range of adjustment is relatively small, approximately six inches for a rod which extends from a minimum length of seven feet six inches to a maximum length of eight feet. It will be appreciated that different adjustment ranges may be provided. To provide maximum beam strength, the inner element is solid, and has a length such that the inner element extends within the outer element approximately the entire length of the outer element when the rod is adjusted to its minimum length.

In order to retain garment hanger hooks, a hanger-securing bar is movably mounted to the adjustable-length rod along an upper surface thereof. One end of the hanger-securing bar is attached to the tubular outer element, and the other end of the hanger securing bar is attached to the inner element. At least one of the adjustable-length rod and the hanger-securing bar includes an elongate slot for a through bolt to accommodate relative movement as the outer and inner elements are telescopingly adjusted. Preferably, it is the hanger-securing bar which includes the elongate slot, and the elongate slot has a length corresponding to the six-inch range of adjustment.

For mounting the transfer rack within the truck, a pair of adaptable hooks are provided at respective ends of the adjustable-length rod. The adaptable hooks are configured so as to engage tie-down attachments either in the form of tie-down rings or in the form of horizontal slats on opposite sides of the truck inner walls. Preferably the adaptable hooks each include a straight portion extending vertically upward from the adjustable-length rod, and then curve downward to distal ends lower than the adjustable-length rod.

DESCRIPTION OF THE DRAWINGS

While the novel features of the invention are set forth with particularity in the appended claims, the invention, both as to organization and content, will be better understood and appreciated, along with other objects and features thereof, from the following detailed description, taken in conjunction with the drawings, in which:

FIG. 3 is an elevational view of the transfer rack shown, for purposes of illustration, engaging alternative forms of truck tie-down attachments at either end thereof;

FIG. 4 is a plan view corresponding to FIG. 3;

FIG. 5 is a section taken along line 5—5 of FIG. 3;

FIG. 6 is a section taken along line 6—6 of FIG. 3; and

FIG. 7 is a section taken along line 7—7 of FIG. 3.

DETAILED DESCRIPTION

Figure 1:
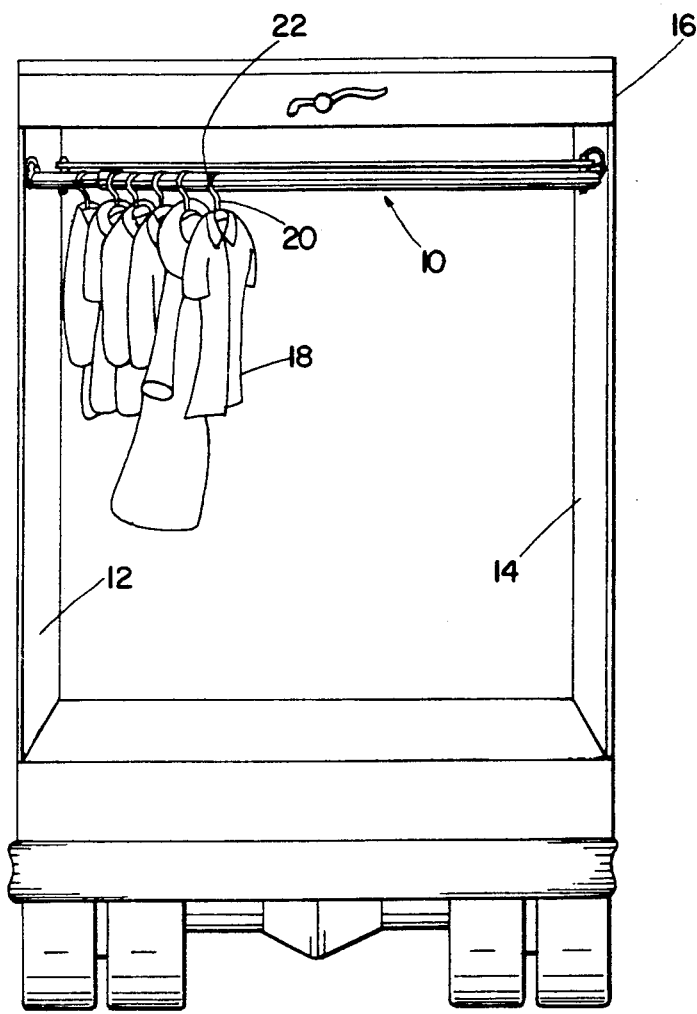
FIG. 1 is a perspective view into the rear of a truck depicting transfer rack in accordance with the invention in place, with a plurality of garments on hangers supported on the rack.

Referring first to FIG. 1, a transfer rack in accordance with the invention, generally designated 10, is shown mounted in position within opposite interior side walls 12 and 14 of a truck 16, representative of a typical rental truck. The transfer rack 10 supports an assortment of garments 18 on hangers 20 having hooks 22, with space below the garments 18 such that the garments 18 hang freely and are not unduly wrinkled. It will be appreciated that other articles (not shown) being transported in the truck 16 may be placed in the space below the garments 18. The transfer rack 10 telescopes in length over a six-inch range from seven feet six inches to eight feet, which has been found to fit commonly-available sizes of rental trucks.

Figure 2:
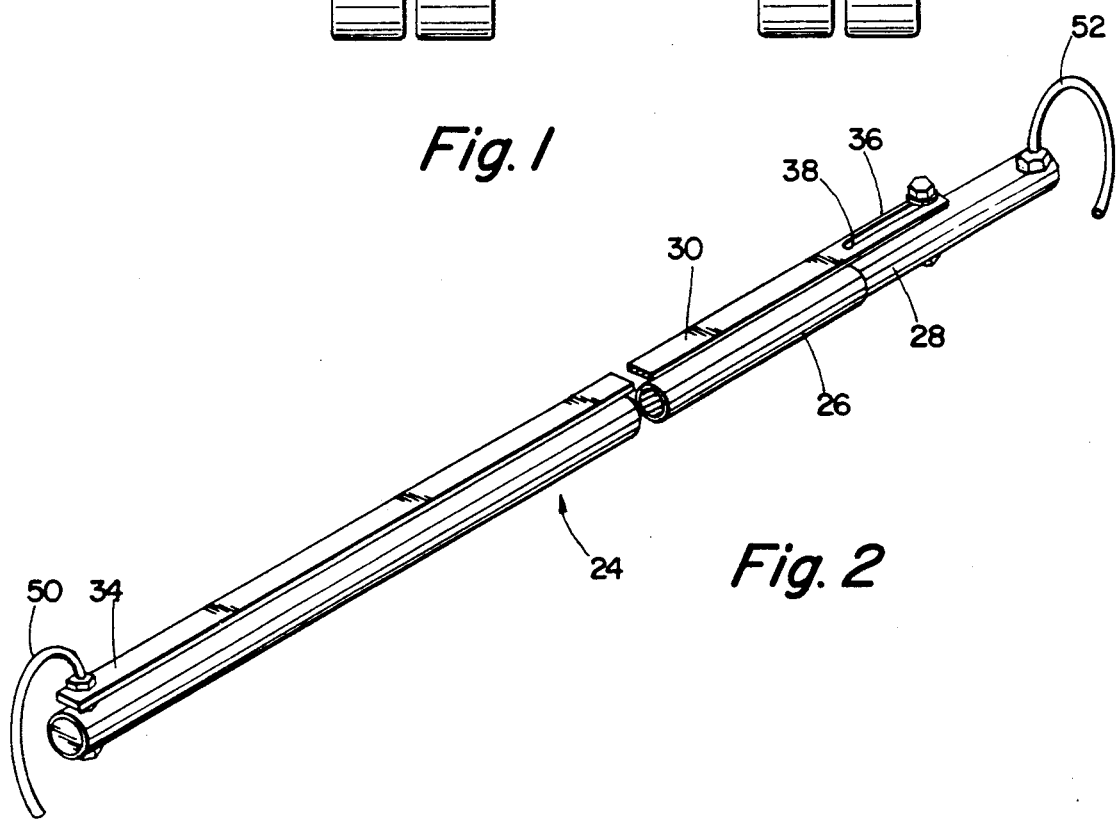
FIG. 2 is a three-dimensional view depicting the overall construction of the transfer rack.

Referring now additionally to FIGS. 2, 3 and 4, the transfer rack 10 includes an adjustable-length rod 24 for supporting the garment hangers 20 by their hooks 22. More particularly, the adjustable length rod 24 includes a tubular outer element 26 and an inner element 28 telescopingly received in the outer element 26 so as to provide a range of adjustment, for example, a six-inch range of adjustment.

To provide substantial beam strength without undue weight, the outer element 26, comprises a one inch schedule 40 aluminum tube having an O.D. of 1.315 inch and an I.D. of 1.049 inch. The inner element 28 comprises a one-inch diameter solid aluminum rod. Each of the elements 26 and 28 is approximately seven feet long such that the inner element 28 extends within the outer element 26 approximately the entire length of the outer element 26 when the adjustable-length rod 24 is adjusted to its minimum length. In FIGS. 3 and 4, the adjustable-length rod 24 is adjusted to its maximum length, with the end position of the inner element 28 within the outer element 26 indicated at 29. In this manner, significant beam strength is provided, whereby the rod 24 can support a weight of 400 pounds, for a maximum rated load capacity of 350 pounds. The transfer rack 10 itself weighs only twelve pounds.

For retaining garment hanger 20 hooks 22, a hanger-securing bar 30 is movably mounted to the adjustable-length rod 24 along an upper surface 32 thereof. The hanger-securing bar 30 may be made of ¼ inch by ¾ inch aluminum bar stock, approximately seven feet six inches in length. One end 34 of the hanger-securing bar 30 is attached to the tubular outer element 26, and the other end 36 of the hanger-securing bar is attached to the inner element 28. As described hereinbelow, the hanger-securing bar 30 is attached in a manner such that it can be moved to allow garments to be hung quickly, and yet holds garments securely in place while traveling.

In order to accommodate relative movement as the outer 26 and inner 28 elements are telescopically adjusted, at least one of the adjustable-length rod 24 and the hanger-securing bar 30 includes an elongate slot for a through bolt. In the preferred embodiment as illustrated, it is the hanger-securing bar 30 which includes an elongate slot 38 through which a bolt 40 passes. As may be best seen in FIGS. 3 and 6, the bolt 40 also passes through an aperture 42 in the solid inner element 28, and is secured by a wing nut 43 to facilitate length adjustment. Washers 44 and 46 above and below the hanger-securing bar 30 facilitate adjustment without binding and aid in clamping as the wing nut 43 is tightened.

For supporting the transfer rack 10 between the interior side walls 12 and 14 of the truck 16, a pair of adaptable hooks 50 and 52 are provided. The hooks 50 and 52 are adaptable in the sense that they are configured so as to engage alternative forms of tie-down attachments as will be found in various makes and models of trucks.

Tie-down attachments are provided for the purpose of attaching ropes or elastic cords used to secure loads within a truck. It is a feature of the invention that such existing tie-down attachments are advantageously employed.

FIGS. 3 and 4 each illustrate two alternative forms of tie-down attachments. It will appreciated that an individual truck will usually have either one form or the other, and it is for convenience of illustration only that each of FIGS. 3 and 4 depicts the two forms of tie-down attachments.

Thus, in FIGS. 3 and 4, the hook 50 is shown engaging a conventional tie-down ring 54 in the form of an ordinary eye bolt 54 appropriately secured to the truck interior sidewall 14. The other hook 52 is shown engaging a horizontal slat or rail 56 spaced from the truck interior sidewall 12. Such horizonal slats 56 extend from front to back along the truck side wall 12 and are spaced therefrom by means of periodic spacers (not shown) such that there is a gap between the slat 56 and the interior wall 12, for the usual purpose of securing a loop of rope.

As may be best seen in FIG. 3, the hooks 50 and 52 are relatively high, with respective straight portions 58 and 59, extending vertically upward from the adjustable-length rod 24, before curving downward to distal ends 60 and 61 lower than the bottom of the adjustable-length rod 24. This particular configuration for the hooks 50 and 52 results in a secure attachment which does not jar loose with ordinary road bumps, notwithstanding the fact there is no positive attachment. The hooks 50 and 52 may be made of ¼ inch diameter type 303 stainless steel.

As may be best seen in FIGS. 3 and 7, the hook 52 is secured to the telescoping rod 24 by being mounted through an aperture 62 near the end of the solid inner element 28. The hook 52 has a threaded portion 64 at the lower end thereof whereby the inner element 28 is effectively clamped between nuts 66 and 68.

As may be best seen in FIGS. 3 and 5, the other hook 50 is secured in a similar manner, except that the hook 50 and a threaded portion 70 thereof serve also to retain the end 34 of the hanger-securing bar 30. The threaded portion 70 of the hook 50 passes through a circular aperture 72 in the hanger-securing bar 30 and through apertures 74 and 76 in the tubular outer element 26. The entire assembly is secured generally between nuts 78 and 80. In order to prevent the tubular outer element 26 from deforming or collapsing as a result of compressive forces when the nuts 78 and 80 are tightened, a solid, one inch diameter plug 82 approximately four inches long is provided within the end of the outer element 26. The hanger securing bar 30 is spaced from the outer element 26 by means of a washer 84, corresponding to the washer 46 of FIG. 6, and another washer 86 is provided between the upper surface of the hanger-securing bar 30 and the nut 78.

While a specific embodiment of the invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A transfer rack for transportation of garments on hangers in a truck having opposite-side tie-down attachments on interior walls thereof, said hanger bar comprising:

an adjustable-length rod for supporting garment hangers having hooks, said adjustable length rod including a tubular outer element and an inner element telescopingly received in said outer element so as to provide a range of adjustment;

a hanger-securing bar movably mounted to said adjustable-length rod along an upper surface thereof to retain garment hanger hooks, one end of said hanger-securing bar being attached to said tubular outer element and the other end of said hanger securing bar being attached to said inner element, and at least one of said adjustable-length rod and said hanger-securing bar including an elongate slot for a through bolt to accommodate relative movement as said outer and inner elements are telescopically adjusted; and a pair of adaptable hooks at respective ends of said adjustable-length rod, said adaptable hooks being configured so as to engage tie-down attachments either in the form of tie-down rings or in the form of horizontal slats on opposite sides of the truck interior walls.

2. A transfer rack in accordance with claim 1, wherein said hanger-securing bar includes said elongate slot.

3. A transfer rack in accordance with claim 2, wherein said elongate slot has a length corresponding to the range of adjustment.

4. A transfer rack in accordance with claim 1, wherein the range of adjustment is approximately six inches.

5. A transfer rack in accordance with claim 3, wherein the range of adjustment is approximately six inches.

6. A transfer rack in accordance with claim 4, wherein inner element has a length sufficient to extend within said outer element approximately the entire length of said outer element when said adjustable-length rod is adjusted to a minimum length, whereby maximum beam strength is provided.

7. A transfer rack in accordance with claim 1, wherein said inner element is solid.

8. A transfer rack in accordance with claim 6, wherein said inner element is solid.

9. A transfer rack in accordance with claim 1, wherein said adaptable hooks each include a straight portion extending vertically upward from said adjustable-length rod, and said adaptable hooks curve downward from said straight portions to distal ends lower than said adjustable-length rod.

* * * * *